(12) United States Patent
Li et al.

(10) Patent No.: US 9,077,816 B2
(45) Date of Patent: Jul. 7, 2015

(54) LOCAL ROAMING CHARGING IN LTE/EPC NETWORKS

(75) Inventors: Xiangyang Li, PuDong Jinqiao Shanghai (CN); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/637,688

(22) PCT Filed: Mar. 30, 2010

(86) PCT No.: PCT/CN2010/071407
§ 371 (c)(1),
(2), (4) Date: Sep. 27, 2012

(87) PCT Pub. No.: WO2011/120217
PCT Pub. Date: Oct. 6, 2011

(65) Prior Publication Data
US 2013/0017803 A1    Jan. 17, 2013

(51) Int. Cl.
| | |
|---|---|
| H04W 4/26 | (2009.01) |
| H04W 8/02 | (2009.01) |
| H04M 15/00 | (2006.01) |
| H04L 12/14 | (2006.01) |
| H04W 4/24 | (2009.01) |

(52) U.S. Cl.
CPC .......... *H04M 15/00* (2013.01); *H04L 12/1403* (2013.01); *H04M 15/64* (2013.01); *H04M 15/8038* (2013.01); *H04M 15/83* (2013.01); *H04M 15/8351* (2013.01); *H04M 15/854* (2013.01); *H04W 4/24* (2013.01)

(58) Field of Classification Search
USPC ................................................. 455/406, 466
See application file for complete search history.

(56) References Cited

U.S. PATENT DOCUMENTS

| | | | |
|---|---|---|---|
| 5,794,140 A | 8/1998 | Sawyer | |
| 8,374,578 B2 * | 2/2013 | Ylikoski | ........................ 455/406 |
| 2003/0125968 A1 * | 7/2003 | Uppal | .................................. 705/1 |
| 2004/0125781 A1 * | 7/2004 | Walter et al. | .................. 370/338 |

(Continued)

FOREIGN PATENT DOCUMENTS

| | | |
|---|---|---|
| CN | 101257394 A | 9/2008 |
| CN | 101378323 A | 3/2009 |

(Continued)

OTHER PUBLICATIONS

International Search Report for PCT/CN2010/071407 dated Jan. 6, 2011.

(Continued)

*Primary Examiner* — Jinsong Hu
*Assistant Examiner* — Jean Chang
(74) *Attorney, Agent, or Firm* — Fay Sharpe LLP (57) ABSTRACT

Communication networks and methods are disclosed for performing local roaming charging in LTE/EPC networks. A visited Online Charging System (OCS) in the LTE/EPC network receives a credit request from a network element in a visited network that has been requested to provide a service to a roaming mobile device. In response to the credit request, the visited OCS determines a local rating for the service based on a local tariff defined by the operator of the visited network. The visited OCS grants a quota of service units to the network element based on the local rating, and transmits a credit response to the network element indicating the granted quota.

17 Claims, 7 Drawing Sheets

(56) References Cited

U.S. PATENT DOCUMENTS

2009/0327112 A1* 12/2009 Li et al. .......................... 705/34
2011/0004528 A1* 1/2011 Donohue et al. ................ 705/19

FOREIGN PATENT DOCUMENTS

| CN | 101521868 A | 9/2009 |
| EP | 2 112 780 A1 | 10/2009 |
| JP | 2000261575 | 9/2000 |
| WO | WO 00/69201 | 11/2000 |
| WO | WO 2009/128874 | 10/2009 |

OTHER PUBLICATIONS

Supplementary European Search Report of related European Application No. EP 10 84 8678 dated Aug. 14, 2013, 3 pages.

* cited by examiner

LOCAL ROAMING CHARGING IN LTE/EPC NETWORKS

FIELD OF THE INVENTION

The invention is related to the field of communication networks and, in particular, to an online charging in LTE/EPC networks for users roaming in a visited network.

BACKGROUND

Service providers typically provide numerous voice and/or data services to subscribers using wireline and/or wireless communication networks. Exemplary services include cellular telephony, access to the Internet, gaming, broadcasting or multicasting of audio, video, and multimedia programming, etc. Mobile devices, such as cell phones, personal data assistants, smart phones, pagers, text messaging devices, global positioning system (GPS) devices, network interface cards, notebook computers, and desktop computers, may access the services provided by the communication networks over an air interface with one or more base stations. Communication between the mobile devices and base stations is governed by various standards and/or protocols, such as the standards and protocols defined by the 3rd Generation Partnership Project (3GPP, 3GPP2).

Network operators use offline and online charging functions to keep track of the charges incurred by each mobile device for accessing the various services. The 3GPP/3GPP2 standards groups have defined a set of specifications that may be used to implement online charging systems and offline charging systems to cover charging in the various network domains (e.g., a circuit-switched network domain, a packet-switched network domain, and/or a wireless domain), IP multimedia subsystems (IMS), and emerging 3G/OMA application services.

Online charging is generally defined as a charging mechanism where charging information can affect the service rendered in real-time, and therefore a direct interaction of the charging mechanism with session/service control is needed. In online charging, charging information for network resource usage is collected concurrently with the resource usage (to provide a service). However, authorization for the network resource usage is obtained by the network prior to the actual resource usage. The network elements in a communication network include Charging Trigger Functions (CTF). For online charging, the CTF triggers on charging events, collects charging information pertaining to the charging events, and assembles the charging information into matching charging events. The CTF then transmits credit requests to the Online Charging System (OCS) to obtain authorization for the charging event/network resource usage requested by the end user. The CTF delays the actual resource usage until permission has been granted by the OCS. When a granted quota of service units is obtained from the OCS, the CTF in the network element allows resource usage to begin and performs budget control during the resource usage. The CTF enforces termination of the end user's resource usage when permission by the OCS is not granted or expires.

There are a variety of types of networks operable to provide voice and data communications for mobile users. One present project within the 3GPP is the Long Term Evolution (LTE) which is a project to improve the UMTS mobile phone standard to cope with future requirements. The architecture defined by this project is referred to as the Evolved Packet System (EPS). The EPS architecture comprehends E-UTRAN (Evolved UTRAN) on the access side and EPC (Evolved Packet Core) on the core side. The LTE/EPC network includes a variety of network elements, some of which include a serving gateway (S-GW), a packet data network gateway (PDN-GW), an HRPD serving gateway (HSGW), a AAA proxy server, and a policy and charging rule function (PCRF).

LTE/EPC network allows for roaming between a home network and one or more visited networks. Roaming is a general term in mobile communications that refers to the extending of service in a location that is different from the home location where the service was registered. There are two types of roaming in LTE/EPC networks: home roaming and local roaming. For home roaming, the S-GW is located in the visited network, but the PDN-GW is located in the home network. When the end user begins to use a service in the visited network, the S-GW in the visited network will route data traffic back to the PDN-GW in the home network. Thus, services are still provided via the PDN-GW in the home network. For the local roaming however, both the S-GW and the PDN-GW are located in the visited network. When the end user starts to use a service, the S-GW in the visited network directly routes data traffic to the PDN-GW in the visited network. Thus, services are provided via the PDN-GW in the visited network.

In the present market deployment, the local roaming model is not widely deployed because it is not clearly defined how the operator of the home network charges for services provided in the visited network. The 3GPP standards (e.g., 3GPP TS 32.820) still simply follow the existing home roaming charging model, which does not work well for the local roaming scenario.

SUMMARY

Embodiments described herein provide online charging in LTE/EPC networks for the local roaming scenario. To provide local roaming charging, a visited Online Charging System (OCS) stores local tariffs for services provided in the visited network. The local tariffs are defined by the operator of the visited network. Thus, the visited OCS is able to determine a local rating for the services based on the local tariffs, and grant a quota of service units to network elements in the visited network based on the local rating. This differs from the traditional home roaming charging model defined by the 3GPP where a home OCS rates services provided in the visited network based on tariffs defined in the home OCS. Local roaming charging as described herein is more effective in charging for services provided within the visited network.

One embodiment describes an online charging architecture for an LTE/EPC network. The online charging architecture includes a visited OCS that is operable to receive a credit request from a network element in the visited network that has been requested to provide a service to a roaming mobile device. In response to the credit request, the visited OCS is further operable to determine a local rating for the service based on a local tariff defined by the operator of the visited network. The visited OCS is further operable to grant a quota of service units to the network element based on the local rating, and to transmit a credit response to the network element indicating the granted quota.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
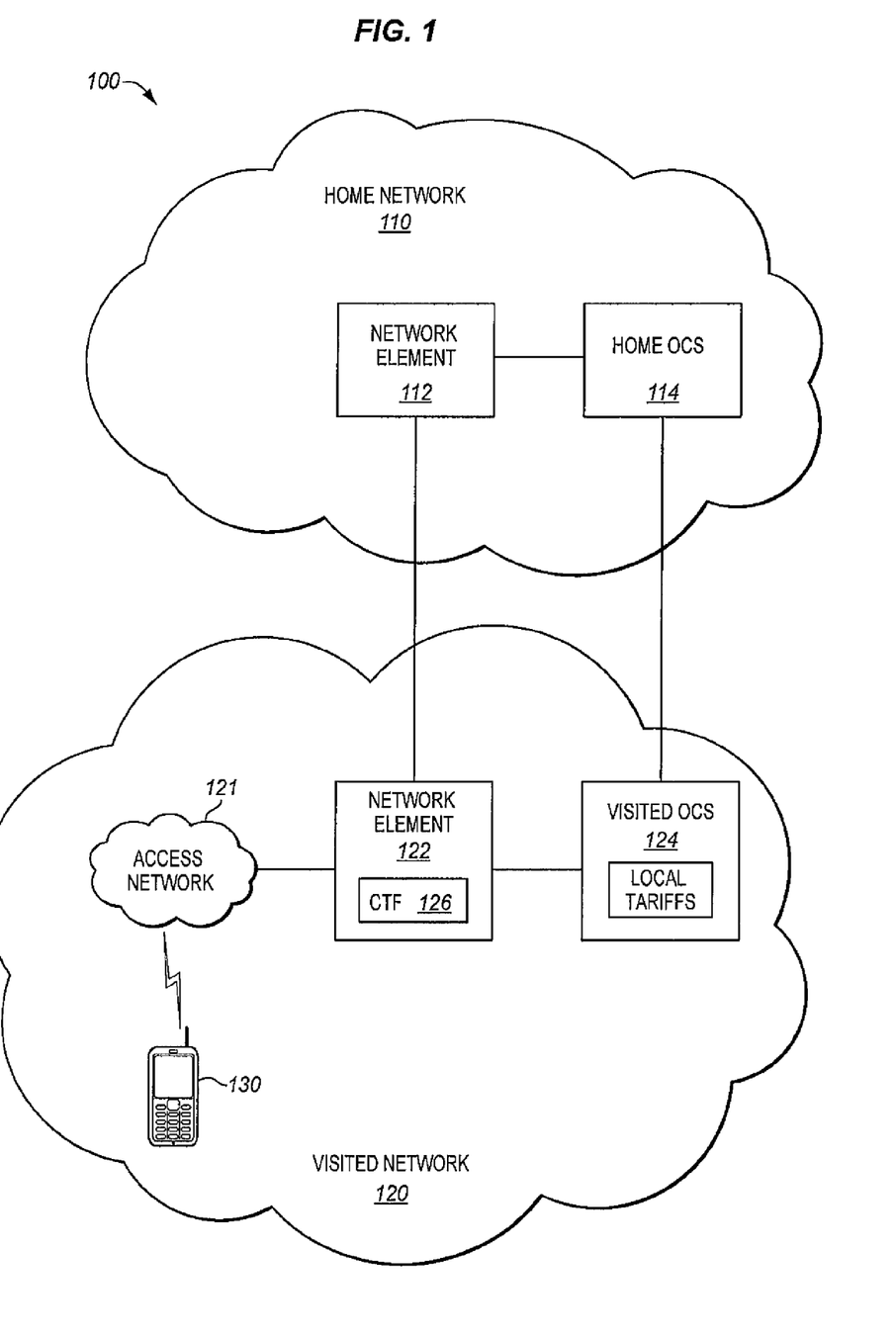
FIG. 1 illustrates a communication network in an exemplary embodiment.

FIG. 1 illustrates a communication network 100 in an exemplary embodiment. Communication network 100 as illustrated in FIG. 1 comprises an LTE/EPC network. The LTE/EPC network includes home network 110 and visited network 120. Home network 110 represents a network where an end user has subscribed to a service plan, and where subscriber data (e.g., a subscriber profile) is stored for the end user, such as in a Home Location Register (HLR), a Home Subscriber Server (HSS), etc. Home network 110 may be a packet-switched network, a circuit-switched network, an IMS network, or another type of 3 GPP network. Home network 110 includes a home network element 112, which comprises any system, server, or function operable to provide session control or provide a service for a session in home network 110. One example of network element 112 is a 3GPP AAA server. Home network 110 further includes a home OCS 114. Home OCS 114 comprises any system, server, or function operable to perform online charging for sessions in home network 110. Home OCS 114 stores account information for users of home network 110, such as in an Account Balance Management Function (ABMF).

Visited network 120 represents a network where an end user has no service plan, but yet extends service to the end user while the end user is roaming. Visited network 120 may be a packet-switched network, a circuit-switched network, an IMS network, or another type of 3GPP network or non-3GPP network. Visited network 120 includes an access network 121, which comprises a wireless network (e.g., cellular network, WiFi network, etc) that provides access to the core network of visited network 120. Visited network 120 further includes a visited network element 122, which comprises any system, server, or function operable to provide session control or provide a service for a session in visited network 120. Examples of network element 122 include a serving gateway (S-GW), a packet data network gateway (PDN-GW), a HRPD serving gateway (HSGW), or a 3GPP AAA proxy server.

Visited network 120 further includes a visited OCS 124. Visited OCS 124 comprises any system, server, or function operable to perform credit control for roaming users in visited network 120. Credit control is a mechanism that directly interacts in real-time with an account of an end user, and controls or monitors the charges related to the service usage. Credit control is a process of checking whether credit is available, credit-reservation, the deduction of credit from the end user account (or an allotment granted from the end user account) when service is completed, and refunding of reserved credit that is not used. Visited OCS 124 stores local tariffs defined by the operator of visited network 120. A local (or visited) tariff comprises a price or cost of services defined by the operator of visited network 120. For example, a local tariff may be the cost per unit time or cost per packet for session-based charging. A local tariff may also be the cost per service for event-based charging (e.g., SMS).

Embodiments provided herein allow for local roaming charging while an end user is roaming in visited network 120. Local roaming charging refers to the scenario where visited OCS 124 assigns a local tariff for services provided by visited network 120, and rates the service based on the local tariff. In some charging architectures, the home OCS 114 assigns a (home) tariff for services provided for a session even though the services are provided through visited network 120. The charging architecture described herein allows visited OCS 124 to assign a local tariff so that the operator of the visited network 120 can more accurately charge for the services provided. For example, assume that home network 110 is located in the United States and visited network 120 is located in Germany. If an end user is roaming in Germany and sends a text message, then the text message will be charged based on the local tariff in Germany rather than the tariff in the United States.

In FIG. 1, assume that the end user of mobile device 130 roams into visited network 120. Mobile device 130 registers with visited network 120 through network element 122 (or another network element not shown) in order to receive services provided by visited network 120. While roaming, further assume that mobile device 130 requests a service that is provided locally through visited network 120. For example, mobile device 130 may request a data service, such as access to Facebook, Skype, Google talk, streaming audio, streaming video, online gaming, etc, that visited network 120 can provide directly without involving home network 110.

Network element 122 receives the service request from mobile device 130, and a Charging Trigger Function (CTF) 126 in network element 122 processes the service request and charging rules for mobile device 130 to determine whether online charging is triggered. Because the end user of mobile device 130 has subscribed to online charging (prepaid), network element 122 needs permission before providing the service. Thus, CTF 126 transmits a credit request to visited OCS 124 with the appropriate request for authorization of the service and for a quota of service units for budget control. In this embodiment, visited OCS 124 provides real-time credit control for the service as follows.

Figure 2:
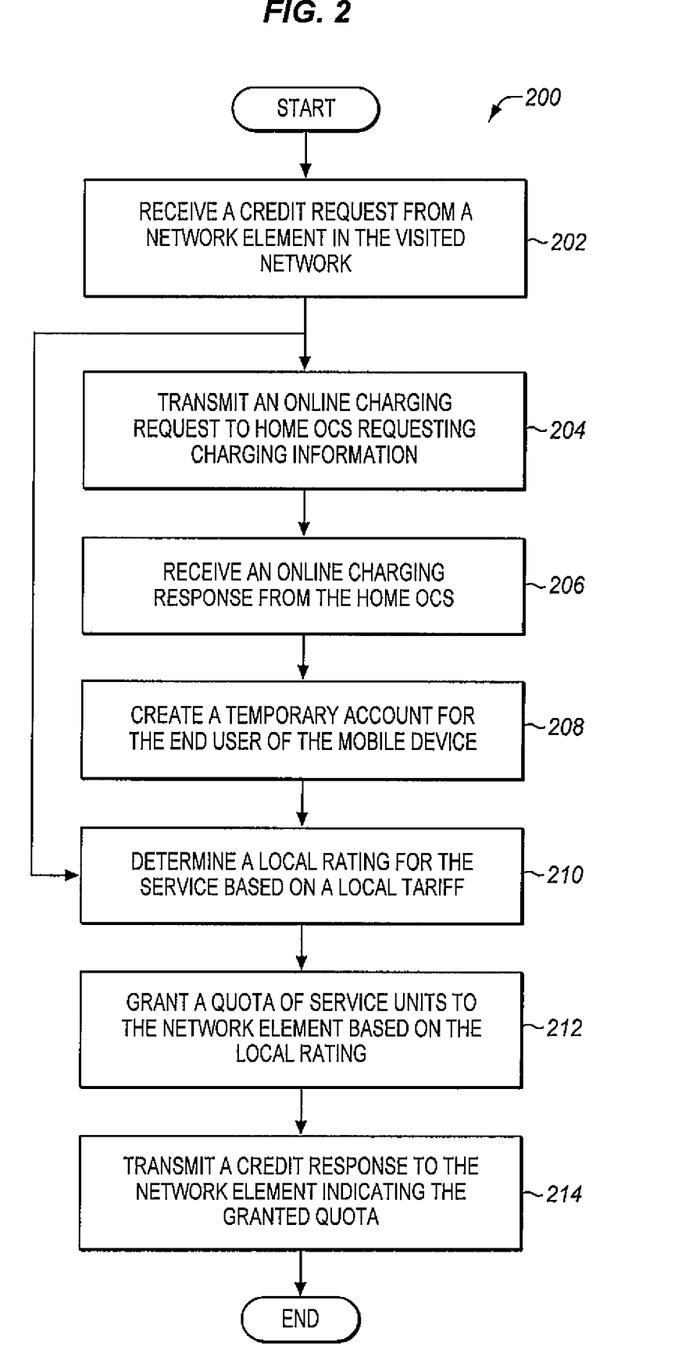
FIG. 2 is a flow chart illustrating a method of performing credit control in a visited network in an exemplary embodiment.

FIG. 2 is a flow chart illustrating a method 200 of performing credit control in visited network 120 in an exemplary embodiment. The steps of method 200 will be described with reference to communication network 100 in FIG. 1, although method 200 may be performed in other networks or systems.

The steps of the flow charts described herein are not all inclusive and may include other steps not shown. The steps may also be performed in an alternative order.

In step 202, visited OCS 124 receives the credit request from CTF 126. The credit request may comprise a Diameter Ro Credit Control Request (CCR) or another type of credit request. Visited OCS 124 is able to perform credit control for the service, which is further indicated in steps 210-214. However, before credit control is performed, visited OCS 124 may need to contact home OCS 114 in order to retrieve charging information for mobile device 130 and reserve credits (see steps 204-208). Because visited OCS 124 is not in the home network 110 for mobile device 130, visited OCS 124 may not have a subscriber profile (or charging profile) for mobile device 130, may not have an account balance for mobile device 130, etc. This is typically the case when mobile device 130 first roams into visited network 120, and when visited OCS 124 has not previously provided credit control for mobile device 130. Thus, although steps 204-208 are shown in FIG. 2, those skilled in the art will appreciate that these steps are optional depending on the information stored by visited OCS 124.

If visited OCS 124 needs to contact home OCS 114, then visited OCS 124 transmits an online charging request to home OCS 114 requesting charging information in step 204. The online charging request identifies mobile device 130 and the service requested by mobile device 130, and also requests that an allotment of service units be reserved for the service. The online charging request may also include an indication that local roaming charging applies for the service. This indicates to home OCS 114 that visited OCS 124 will rate the service based on a local tariff. Depending on the interface used between home OCS 114 and visited OCS 124, a new parameter may be defined for the indication that local roaming charging applies. For example, if the interface between home OCS 114 and visited OCS 124 is the Diameter Ro interface, then the Diameter Ro interface may be enhanced with a new Attribute Value Pair (AVP) that is designated for the indication that local roaming charging will be used.

Figure 3:
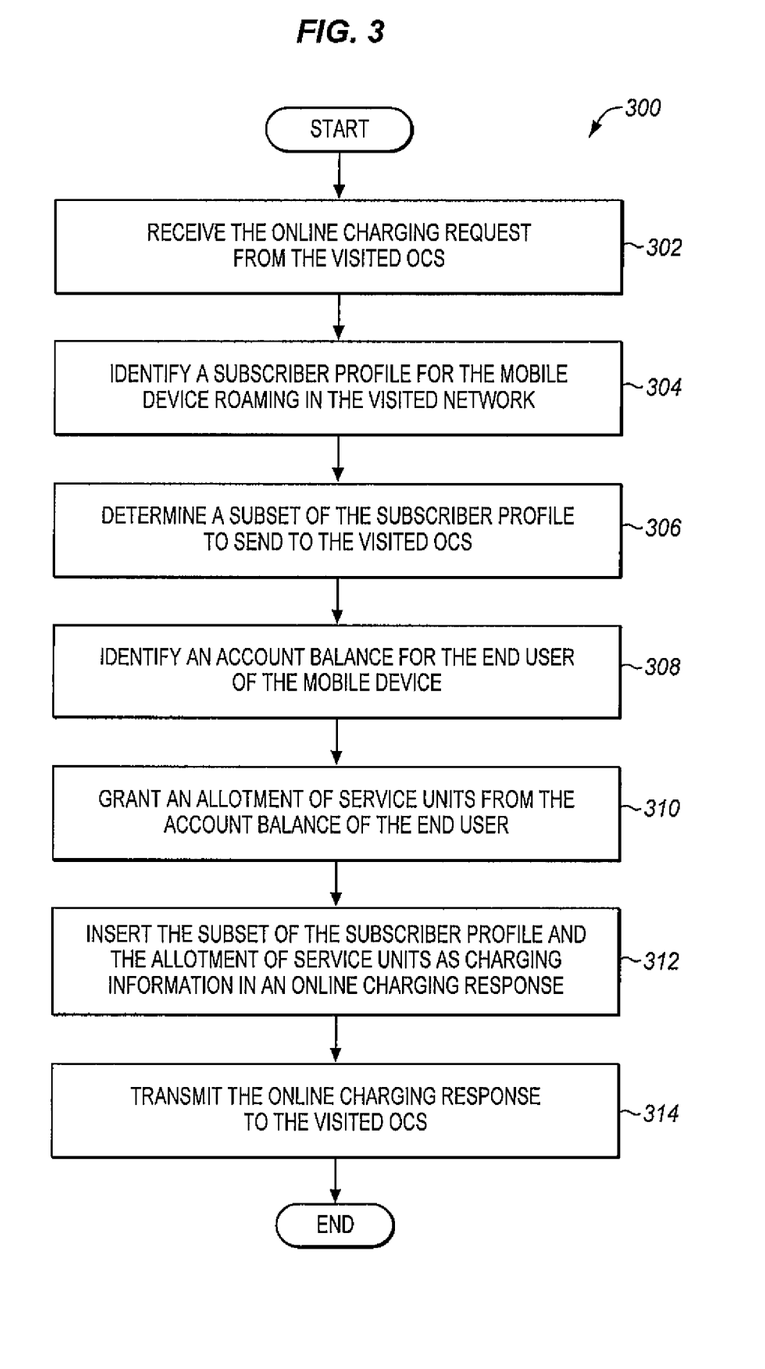
FIG. 3 is a flow chart illustrating a method of providing charging information to a visited OCS in an exemplary embodiment.

In response to the online charging request from visited OCS 124, home OCS 114 operates as described in FIG. 3. FIG. 3 is a flow chart illustrating a method 300 of providing charging information to visited OCS 124 in an exemplary embodiment. In step 302, home OCS 114 receives the online charging request from visited OCS 124. In step 304, home OCS 114 identifies a subscriber profile for the end user of mobile device 130. The subscriber profile (also referred to as a charging profile or charging rules) indicates a service plan that the end user of mobile device 130 has subscribed to, indicates a class of service for the end user, and other relevant charging information. In step 306, home OCS 114 determines a subset of the subscriber profile to send to visited OCS 124. The subset of the subscriber profile represents the information that home OCS 114 determines is needed or desired by visited OCS 124 in order to perform credit control per an agreement between network operators.

In step 308, home OCS 114 identifies an account balance for the end user of mobile device 130. The account balance is typically maintained in an Account Balance Management Function (ABMF) in home OCS 114. The account balance represents the amount of money or other service units that the end user of mobile device 130 has purchased in advance for prepaid services. If the account balance is too low, then home OCS 114 may reject the reservation request. However, if the account balance is sufficient, then home OCS 114 grants an allotment of service units from the account balance for mobile device 130 for use in charging within visited network 120, which is illustrated in step 310. To do so, home OCS 114 evaluates the online charging request, and grants the allotment to visited OCS 124 based on information such as the account balance, the indication of local roaming charging, and an agreement between the network operators. The allotment of service units may represent the entire balance in the account of the end user, or may represent a portion of the account balance. For example, if the end user of mobile device 130 has a balance of 200 service units, then home OCS 114 may allocate 50 service units for visited network 120.

In step 312, home OCS 114 inserts the subset of the subscriber profile and the allotment of service units as charging information in an online charging response. Home OCS 114 may insert other desired charging information in the online charging response. For example, if the currency is different between the two networks, then home OCS 114 may insert a currency rate and a currency/unit conversion rate in the online charging response. Home OCS 114 then transmits the online charging response to visited OCS 124 in step 314.

In FIG. 2, visited OCS 124 receives the online charging response from home OCS 114 that includes the charging information for mobile device 130 in step 206. Visited OCS 124 processes the online charging response to identify the charging information provided by home OCS 114. For example, if the online charging response includes an allotment of service units, then visited OCS 124 creates a temporary account for the end user of mobile device 130 based on the allotment of service units in step 208. Visited OCS 124 may set a life-cycle or time period for the temporary account. Visited OCS 124 may then grant quotas to network elements in visited network 120 based on the temporary account.

Visited OCS 124 then grants a quota to network element 122 responsive to the credit request previously received. To do so, visited OCS 124 determines a local rating for the service based on a local tariff in step 210. As stated above, visited OCS 124 stores one or more local tariffs that are defined by the operator of visited network 120. Thus, visited OCS 124 is able to use the local tariff in order to generate a local rating for the service. In step 210, visited OCS 124 grants a quota of service units to network element 122 from the temporary account of the end user based on the local rating. Visited OCS 124 then transmits a credit response to network element 122 indicating the granted quota in step 212. The credit response may comprise a Diameter Ro Credit Control Answer (CCA) or another type of credit response.

Upon receiving the credit response, the CTF 126 in network element 122 (see FIG. 1) identifies the granted quota, and authorizes the service to be provided to mobile device 130. CTF 126 then provides budget control as network element 122 provides the service to mobile device 130. If the granted quota becomes depleted, then CTF 126 may send another credit request to visited OCS 124 and the process in FIG. 2 repeats.

Visited OCS 124 monitors the temporary account of the end user as quotas are granted to network elements. If the temporary account of the end user becomes depleted, then visited OCS 124 requests an additional credit reservation from home OCS 114 by transmitting another online charging request to home OCS 114. Visited OCS 124 also reports the usage of previous reservations to home OCS 124 in the online charging request. Home OCS 114 will then update the account balance of the end user.

Additionally, if the session ends, the service ends, or the temporary account expires based on the life-cycle, then visited OCS 124 will report an unused portion of temporary account to home OCS 114 by transmitting another online charging request to home OCS 114. Home OCS 114 will then update the account balance of the end user. Visited OCS 124 also generates a Charging Data Record (CDR) for the local roaming charging, and sends the CDR to a billing system of home network 110 for settlement.

Figure 4:
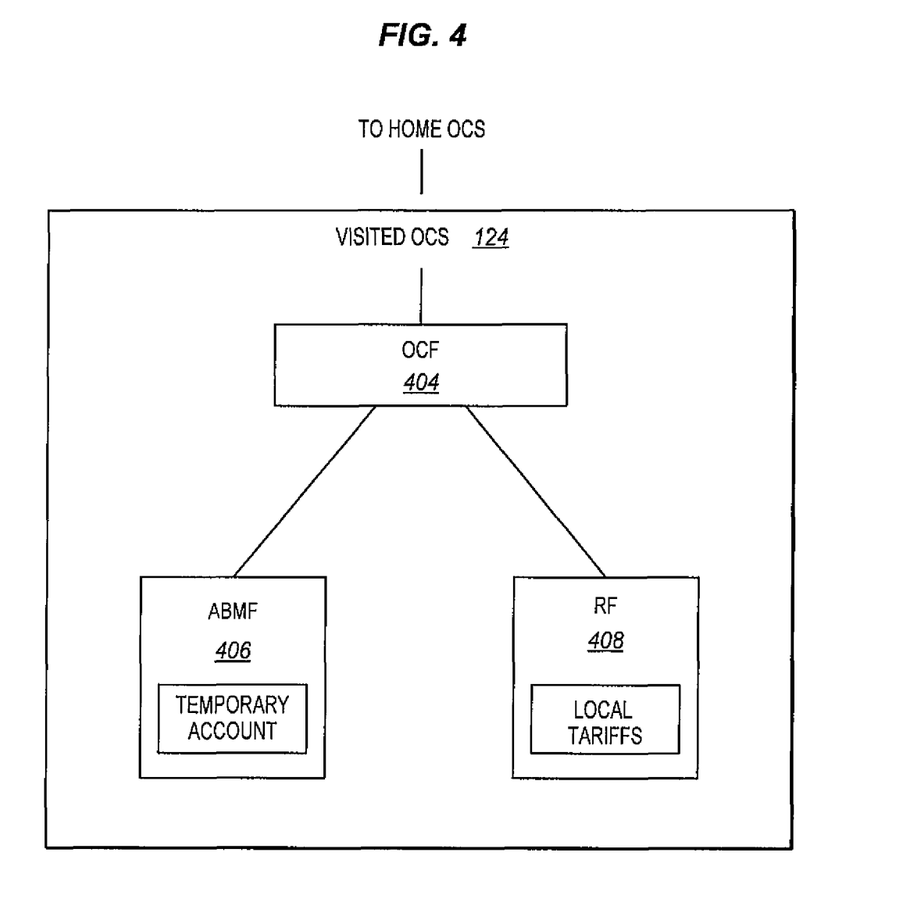
FIG. 4 illustrates a visited OCS in an exemplary embodiment.

FIG. 4 illustrates visited OCS 124 in an exemplary embodiment. In this embodiment, visited OCS 124 includes an online charging function (OCF) 404, an Account Balance Management Function (ABMF) 406, and a rating function (RF) 408. OCF 404 comprises any system, server, or function operable to manage online charging in visited OCS 124 by accessing ABMF 406 and rating function 408. ABMF 406 comprises any system, server, or function operable to maintain an allotment of service units that was granted by home OCS 114 in a temporary account. Rating function 408 comprises any system, server, or function operable to determine a rating for a session or service in visited network 120. Rating function 408 stores local tariffs defined by the operator of visited network 120.

Figure 5:
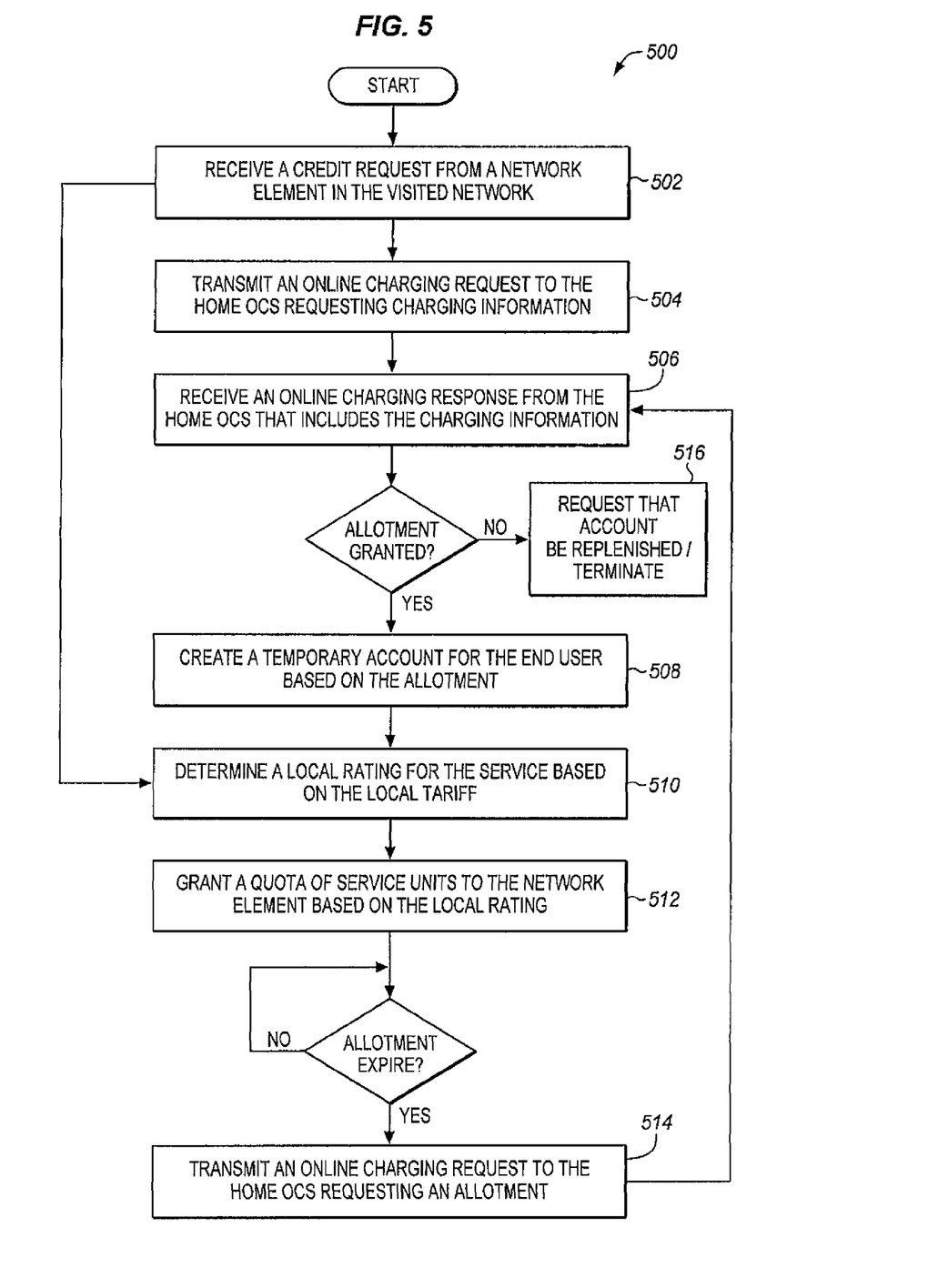
FIG. 5 is a flow chart illustrating another method of performing credit control in a visited network in an exemplary embodiment.

FIG. 5 is a flow chart illustrating another method 500 of performing credit control in visited network 120 in an exemplary embodiment. This method illustrates more detailed steps of how credit control may be performed in the visited OCS 124 as shown in FIG. 4.

Similar to FIG. 2, OCF 404 receives the credit request from CTF 126 in step 502. OCF 404 then transmits an online charging request to home OCS 114 to acquire charging information for mobile device 130 in step 504. Home OCS 114 then operates as described in FIG. 3 to provide charging information to visited OCS 124. In step 506, OCF 404 receives the online charging response from home OCS 114 that includes the charging information. OCF 404 processes the charging information in the online charging response to identify the allotment of service units granted by home OCS 114 (if any) and the subset of the subscriber profile. If an allotment of service units was granted by home OCS 114, then OCF 404 creates a temporary account for the end user based on the allotment of service units in ABMF 406.

OCF 404 processes the credit request received from network element 122 (see FIG. 1) to identify the service requested by mobile device 130. OCF 404 then queries rating function 408 for a rating for the requested service. In step 510, rating function 408 determines a local rating for the service based on a local tariff. As stated above, rating function 408 stores one or more local tariffs that are defined by the operator of visited network 120. Thus, rating function 408 is able to use the local tariff in order to generate a local rating for the service. Rating function 408 then responds to OCF 404 with the local rating for the service.

In step 512, OCF 404 grants a quota of service units to network element 122 (or other network elements serving the session) in visited network 120 based on the local rating from the allotment of service units stored in the temporary account. In step 514, OCF 404 transmits a credit response to network element 122 indicating the quota granted to network element 122.

Upon receiving the credit response, the CTF 126 in network element 122 (see FIG. 1) identifies the granted quota, and authorizes the service to be provided to mobile device 130. CTF 126 then provides budget control based on the granted quota as network element 122 provides the service to mobile device 130. If the granted quota becomes depleted, then CTF 126 may send another credit request to visited OCS 124 and the process in FIG. 5 repeats.

As OCF 404 provides credit control for network element 122 and other network elements that serve mobile device 130, ABMF 406 monitors the allotment of service units in the temporary account. If the allotment of service units becomes depleted, then OCF 404 transmits another online charging request to home OCS 114 that requests a new allotment of service units in step 514. If there is a sufficient account balance for user 130, then home OCS 114 may grant another allotment of service units in response to the online charging request (see also FIG. 3).

Method 500 then returns to step 506, where OCF 404 receives another online charging response from home OCS 114. In step 508, OCF 404 processes the charging information inserted in the online charging response to identify if a new allotment of service units was granted by home OCS 114. If a new allotment was granted, then OCF 404 stores the new allotment in the temporary account for the end user and performs credit control based on the new allotment. For example, OCF 404 may determine a local rating for the data service, and grant new quotas of service units to network element 122 or other network elements based on the new allotment. If a new allotment was not granted, then OCF 404 may request that user 130 replenish his/her account in home OCS 114 or may terminate the session in step 516.

Visited OCS 124 as shown in FIG. 4 may store or cache the subset of the subscriber profile for mobile device 130 as received from home OCS 114. However, when the service terminates and visited OCS 124 writes service data into a Charging Data Record (CDR), visited OCS 124 may erase the subset of the subscriber profile for mobile device 130 in the cache per agreement between the operators of home network 110 and visited network 120.

There may be instances where visited OCS 124 uses a mix of the local tariff and a tariff provided by home OCS 114 (referred to as home tariff) when rating a session. When visited OCS 124 requests charging information from home OCS 114, home OCS 114 may provide a home tariff in the charging information along with the allotment of service units. Rating function 408 may then process both the local tariff and the home tariff when rating the service/session. For example, home network 110 may set a tariff for movie watching, such as 1 unit per 10 minute, while visited network 120 sets an additional tariff of an additional 0.1 units per 10 minutes. If mobile device 130 in visited network 120 requests a 3-D movie, then visited OCS 124 matches the service type in the temporary account with the home network tariff and the visited network tariff, and determines a total tariff of 1.1 units per 10 minutes. Thus, visited OCS 124 uses a mix of the local tariff and a tariff provided by home OCS 114.

EXAMPLE

Figure 6:
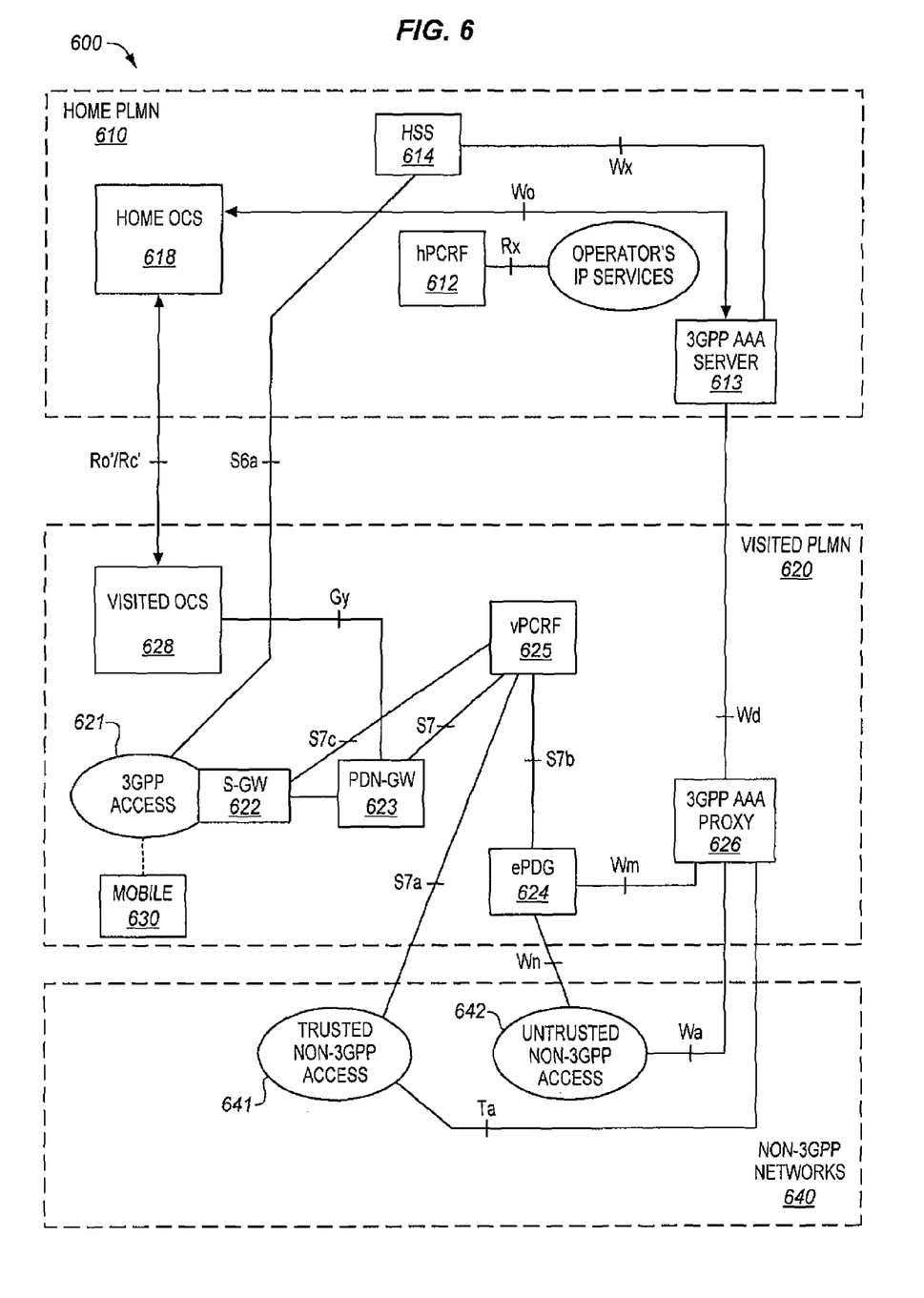
FIG. 6 illustrates an LTE/EPC network in an exemplary embodiment.
Figure 7:
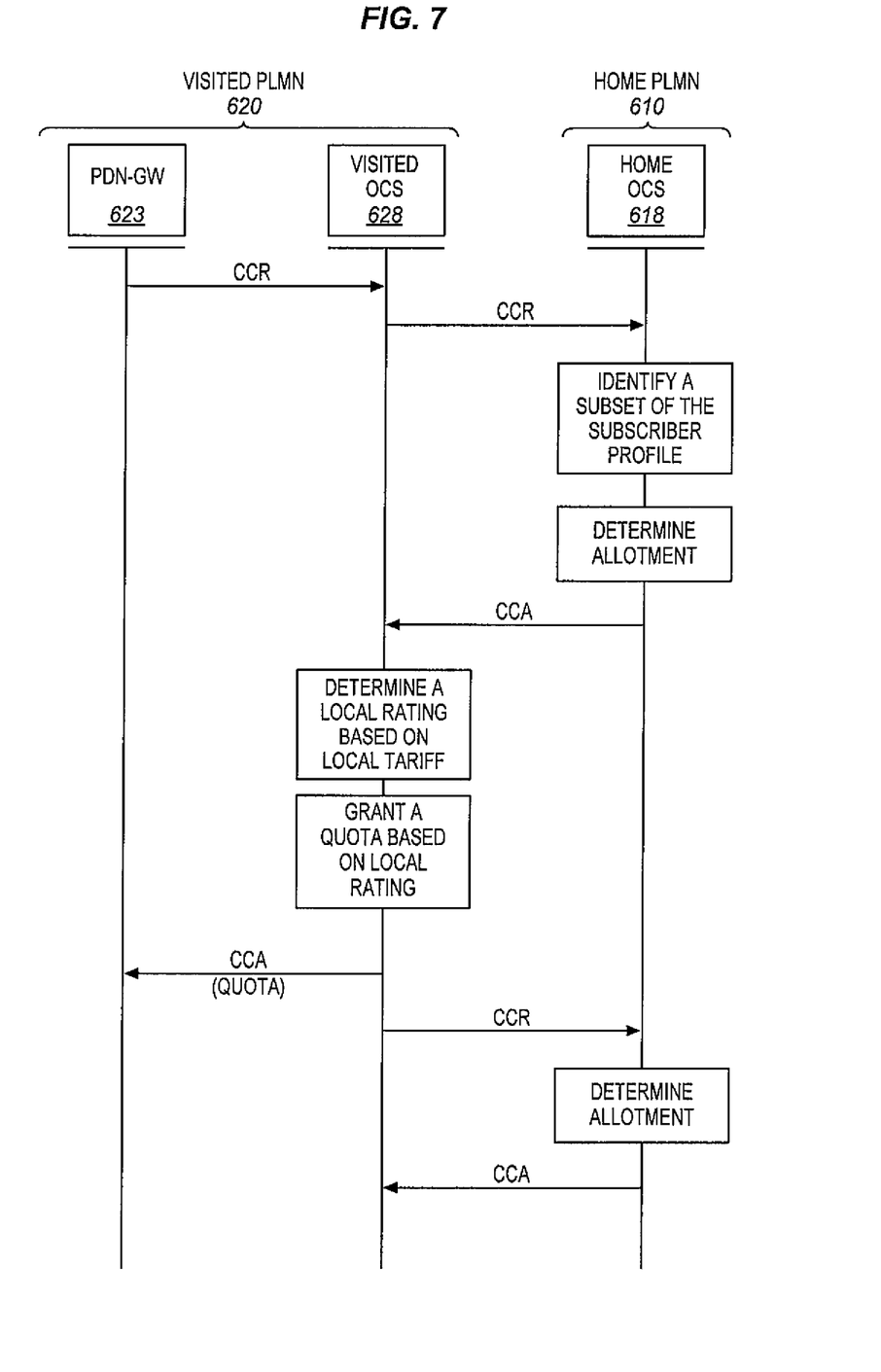
FIG. 7 is a message diagram illustrating the credit control being performed in a visited PLMN in an exemplary embodiment.

FIGS. 6-7 illustrate an example of an LTE/EPC network implementing the improved charging architecture. FIG. 6 illustrates an LTE/EPC network 600 in an exemplary embodiment. LTE/EPC network 600 includes a home Public Land Mobile Network (PLMN) 610, a visited PLMN 620, and one or more non-3GPP networks 640. Home PLMN 610 represents the network where an end user of a mobile device 630 has subscribed to a service plan. Home PLMN 610 includes a Home Policy and Charging Rules Function (hPCRF) 612, a 3GPP AAA server 613, a Home Subscriber Server (HSS) 614, and a home OCS 618.

Visited PLMN 620 represents a network where the end user of mobile device 630 has no service plan, but yet extends service to mobile device 630 while roaming. Visited PLMN 620 includes a 3GPP access network 621, an S-GW 622, a PDN-GW 623, a Packet Data Gateway (ePDG) 624, a Visited PCRF (vPCRF) 625, a 3GPP AAA proxy server 626, and a visited OCS 628. The scenario in FIG. 6 represents roaming with local breakout, and the charging provided by visited OCS 628 represents local roaming charging.

Non-3GPP network 640 includes a trusted non-3GPP access network 641 and an un-trusted non-3GPP access network 642.

In the charging architecture of LTE/EPC network 600, visited OCS 628 provides credit control for sessions occurring in visited PLMN 620. The network elements in visited PLMN 620 communicate with visited OCS 628 over a variety of interfaces. For example, PDN-GW 623 communicates with visited OCS 628 over the Diameter Gy interface. Additionally, visited OCS 628 communicates with home OCS 618 over an enhanced Diameter Rc' interface and an enhanced Ro' interface.

In visited PLMN 620, PDN-GW 623 will interface with visited OCS 628 via the Gy reference point as defined in TS 23.203 and 32.240. The Gy reference point allows online credit control for service data flow based charging. The functionalities required across the Gy reference point use existing functionalities and mechanisms based on RFC 4006.

In support of LTE/EPC online charging, PDN-GW 623 collects charging information for PCRF 625 and S-GW 622. S-GW 622 charging is billed by the following types: time-based billing, volume-based billing, and event-based billing. LTE and CDMA charging is billed per transaction as user per IMSI, and QoS Class Indicator (QCI) (i.e., a new record is created for each QoS flow or QoS change). PDN-GW 623 charging is billed by the following types: time-based billing, volume-based billing, and event-based billing. LTE and CDMA charging is billed per transaction based on user per IMSI, QoS Class Indicator (QCI), flow (i.e., flow based charging with IP address and UDP port), application type (i.e., call forwarding, 411 call, SMS, location service and quantity of file downloads or actual video streaming play time), content type (i.e., messaging, e-mail, application download, game session, etc), protocol type (i.e., FTP, RTP, RSTP, Video, etc), and destination server (IP address or TCP/UDP port). The interface between S-GW 622 and PDN-GW 623 may be PMIP. PDN-GW 623 collects PMIP based charging records in PDN-GW CDR which can be enhanced from PDSN User Data Record or UDR (for IP network part) and Flow Data Record or FDR.

Additional charging related actions may be supported in PDN-GW 623. PDN-GW 623 may deny the service. For example, PDN-GW 623 may deny the packet from a list of denied destination servers. PDN-GW 623 may be capable of mid session control for prepaid or subscription service with redirection capabilities. For example, PDN-GW 623 may redirect a session to a payment center if there is billing issue for this user or charging balance. PDN-GW 623 may provide Advise of Charging (AoC) if present balance is below a minimum threshold.

In this embodiment, assume that mobile device 630 registers or subscribes to service with home PLMN 610, but is roaming in visited PLMN 620. Also assume that mobile device 630 initiates or is invited into a data session while roaming in visited PLMN 620. For the session, S-GW 622, PDN-GW 623, AAA proxy 426, and/or other network elements in visited PLMN 620 are requested to provide a service to mobile device 630. Because the user of mobile device 630 has subscribed to online charging (prepaid), S-GW 622, PDN-GW 623, AAA proxy 626, and/or other network elements need permission before providing the service.

FIG. 7 is a message diagram illustrating credit control being performed in visited PLMN 620 in an exemplary embodiment. The message diagram illustrates Diameter messaging used within LTE/EPC network 600. Assume that mobile device 630 requests a service/session that is served by PDN-GW 623. PDN-GW 623 receives charging rules from vPCRF 625 indicating the services allowed for mobile device 630. The charging rules are stored in a PCEF in PDN-GW 623. When mobile device 630 requests the service, PDN-GW 623 determines whether the service is allowed. If the service is allowed, PDN-GW 623 further processes Policy and Charging Control (PCC) rules, which define the conditions that trigger online charging for the services provided by PDN-GW 623.

If online charging is triggered, then PDN-GW 623 transmits a Diameter Ro CCR to visited OCS 628 with the appropriate request for authorization of the service and for a quota of service units. Visited OCS 628 provides credit control for the service(s) so that the services may be rated based on a local tariff. Before providing credit control, visited OCS 628 requests an allotment of service units and other charging information from home OCS 618 as follows. Visited OCS 628 transmits a Diameter Ro CCR to home OCS 618 requesting the charging information and credit reservation. In this embodiment, the Diameter Ro interface is enhanced with a new AVP designated for an indication that the charging model used will be local roaming charging. This indicates to home OCS 618 that visited OCS 628 will rate the service based on a local tariff. Thus, home OCS 618 does not need to include a rating in the response back to visited OCS 628.

Responsive to receiving the CCR, home OCS 618 identifies the mobile device 630 involved in the session and identifies the subscriber profile for the end user of mobile device 630. Because home OCS 618 does not want to provide the entire subscriber profile of the end user to visited OCS 628, home OCS 618 identifies a subset of the subscriber profile that visited OCS 628 may need to perform credit control. Home OCS 618 also identifies an account balance for the end user. If the account balance is too low, then home OCS 618 may reject the reservation request. However, if the account balance is sufficient, then home OCS 618 grants an allotment of service units from the account balance. The allotment of service units may represent the entire balance in the account of mobile device 630, or may represent a portion of the account balance. Home OCS 618 inserts the subset of the subscriber profile and the allotment of service units as charging information in a Diameter Ro CCA, and transmits the CCA to visited OCS 628.

Visited OCS 628 then processes the charging information in the CCA to identify the allotment of service units granted by home OCS 618 (if any) and the subset of the subscriber profile. If the CCA includes an allotment of service units, then visited OCS 628 creates a temporary account for the end user of mobile device 630 based on the allotment of service units. Visited OCS 628 may also set a life-cycle or time period for the temporary account.

Visited OCS 628 determines a local rating for the session based on a local tariff defined by the operator of visited PLMN 620. Visited OCS 628 then grants a quota of service units to PDN-GW 623 based on the allotment of service units, the local rating, and the service and data types. Visited OCS 628 transmits a Diameter Ro CCA to PDN-GW 623 indicating the quota granted to PDN-GW 623. PDN-GW 623 may then provide the service to mobile device 630, and perform budget control based on the granted quota.

As visited OCS 628 provides charging control, visited OCS 628 also monitors the allotment of service units. If the allotment of service units expires, then visited OCS 628 generates another CCR that requests a new allotment of service units. If there is a sufficient account balance for the user of mobile device 130, then home OCS 114 may grant another allotment of service units in an online charging response.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

What is claimed is:

1. A visited Online Charging System (OCS) in a Long Term Evolution with Evolved Packed Core (LTE/EPC) network, comprising an Online Charging Function, an Account Balance Management Function, and a Rating Function, the functions being implemented by at least one processor, the system being configured to:
   receive a credit request from a network element in a visited network that has been requested to provide a service to a roaming mobile device;
   determine a local rating for the service based on a local tariff defined by the operator of the visited network;
   grant a quota of service units to the network element based on the local rating; transmit a credit response to the network element indicating the granted quota; transmit an online charging request to a home OCS of a mobile device requesting charging information for an end user of the mobile device, and to receive an online charging response from the home OCS that includes the charging information,
   wherein the charging information includes an allotment of service units from an account balance of the end user that is granted by the home OCS for use in credit control by the visited OCS;
   create a temporary account for the end user based on the allotment of service units; and
   monitor the temporary account of the end user as quotas are granted to network elements, wherein, if the temporary account becomes depleted, the visited OCS requests an additional credit reservation from the home OCS.

2. The system of claim 1, wherein the visited OCS is further operable to set a life-cycle for the temporary account.

3. The system of claim 2, wherein the visited OCS is further operable to report an unused portion of the temporary account to the home OCS if the life-cycle expires or the service ends.

4. The system of claim 1, wherein the charging information includes a currency conversion rate between the home OCS and the visited OCS.

5. The system of claim 1, wherein the visited OCS is further operable to insert an indication in the online charging request that local roaming charging applies for the service.

6. The system of claim 5, wherein the interface between the visited OCS and the home OCS comprises a Diameter Ro interface, and a new Attribute Value Pair (AVP) is designated for the indication that local roaming charging applies for the service.

7. A method of performing local roaming charging in a Long Term Evolution with Evolved Packet Core (LTE/EPC) network, the method comprising:
   receiving, in a visited Online Charging System (OCS), a credit request from a network element in a visited network that has been requested to provide a service to a roaming mobile device;
   determining, in the visited OCS, a local rating for the service based on a local tariff defined by the operator of the visited network;
   granting a quota of service units to the network element based on the local rating; and
   transmitting a credit response from the visited OCS to the network element indicating the granted quota;
   transmitting an online charging request from the visited OCS to a home OCS of the mobile device requesting charging information for an end user of the mobile device;
   receiving an online charging response from the home OCS that includes the charging information, wherein the charging information includes an allotment of service units from an account balance of the end user that is granted by the home OCS for use in credit control by the visited OCS;
   creating a temporary account for the end user based on the allotment of service units; and
   monitoring, at the visited OCS, the temporary account of the end user as the quotas are granted to the network elements, wherein, if the temporary account becomes depleted, the visited OCS requests an additional credit reservation from the home OCS.

8. The method of claim 7 further comprising:
   setting a life-cycle for the temporary account.

9. The method of claim 8 further comprising:
   reporting an unused portion of the temporary account to the home OCS if the life-cycle expires or the service ends.

10. The method of claim 7, wherein the charging information includes a currency conversion rate between the home OCS and the visited OCS.

11. The method of claim 7, further comprising:
    inserting an indication in the online charging request that local roaming charging applies for the service.

12. The method of claim 11 wherein:
    the interface between the visited OCS and the home OCS comprises a Diameter Ro interface, and a new Attribute Value Pair (AVP) is designated for the indication that local roaming charging applies for the service.

13. An apparatus comprising a memory and a processor, the memory containing a program comprising instructions which, when they are executed in the processor, cause the processor to implement a visited online charging system (OCS) in a Long Term Evolution with Evolved Packed Core (LTE/EPC) network, the OCS comprising:
- a rating function operable to store a local tariff defined by an operator of a visited network; and
- an online charging function (OCF) operable to receive a credit request from a network element in the visited network that has been requested to provide a service to a roaming mobile device;

wherein:
the rating function is further operable to determine a local rating for the service based on the local tariff; and
the OCF is further operable to grant a quota of service units to the network element based on the local rating, and to transmit a credit response to the network element indicating the granted quota;

wherein:
- the OCF is further operable to transmit an online charging request to the a home OCS of the mobile device requesting charging information for an end user of the mobile device, and to receive an online charging response from the home OCS that includes the charging information; the charging information includes an allotment of service units from an account balance of the end user that is granted by the home OCS for use in credit control by the visited OCS;
- the OCF is further operable to create a temporary account for the end user based on the allotment of service units in an account balance management function (ABMF); and
- the ABMF is operable to monitor the allotment of service units in the temporary account, wherein, if the allotment of service units becomes depleted, the OCF is operable to transmit another online charging request to the home OCS that requests a new allotment of service units, wherein, if there is a sufficient account balance for the end user, the home OCS may grant another allotment of service units in response to the online charging request.

14. The apparatus of claim 13 wherein:

the OCF is further operable to set a life-cycle for the temporary account in the ABMF.

15. The apparatus of claim 14 wherein:

the OCF is further operable to report an unused portion of the temporary account to the home OCS if the life-cycle expires or the service ends.

16. The apparatus of claim 13 wherein:

the OCF is further operable to insert an indication in the online charging request that local roaming charging applies for the service.

17. The apparatus of claim 13 wherein:

the interface between the visited OCS and the home OCS comprises a Diameter Ro interface, and a new (Attribute Value Pair) AVP is designated for the indication that local roaming charging applies for the service.

* * * * *